United States Patent [19]

Erdoess et al.

[11] 4,105,744

[45] Aug. 8, 1978

[54] METHOD OF NEUTRALIZING INDUSTRIAL WASTE GASES

[75] Inventors: Emerich Erdoess; Josef Marecek; Karel Mocek; Rudolf Camr; Julius Holovacky; Jiri Prokupek, all of Prague, Czechoslovakia

[73] Assignee: Ceskoslovenska akademie ved, Prague, Czechoslovakia

[21] Appl. No.: 586,261

[22] Filed: Jun. 12, 1975

[30] Foreign Application Priority Data

Jun. 12, 1974 [CS] Czechoslovakia ............ 4159-74
Aug. 2, 1974 [CS] Czechoslovakia ............ 5512-74

[51] Int. Cl.² ............... B01J 8/00; C01L 21/00; C01B 7/00; C01B 17/00
[52] U.S. Cl. ................ 423/239; 423/240; 423/244
[58] Field of Search ............ 423/242–244, 423/239, 235, 240, 241

[56] References Cited

U.S. PATENT DOCUMENTS

| | | | |
|---|---|---|---|
| 3,498,743 | 3/1970 | Kyllonen | 423/239 |
| 3,505,008 | 4/1970 | Frevel et al. | 423/244 |
| 3,524,720 | 4/1970 | Bauer | 423/244 |
| 3,862,295 | 1/1975 | Talles | 423/244 |
| 3,880,629 | 4/1975 | Dulin et al. | 423/242 X |
| 3,976,747 | 8/1976 | Shale et al. | 423/244 |

FOREIGN PATENT DOCUMENTS

435,560  9/1935  United Kingdom ............ 423/244

*Primary Examiner*—O. R. Vertiz
*Assistant Examiner*—Gregory A. Heller

[57] ABSTRACT

Increased quantities of acidic components present in industrial waste gases (particularly nitrogen and sulphur oxides) are removed by active carbonates of alkaline metals prepared in a novel way. A suitable starting material is heated to a temperature of between 30° and 200° C in a stream of gas from which the acidic components have been at least partially removed. The resulting active alkali metal carbonates, free of hydrates, are subsequently brought at temperatures between 100° and 200° C into contact with the humid waste gas. A preferred apparatus for carrying out the method is also described.

10 Claims, 1 Drawing Figure

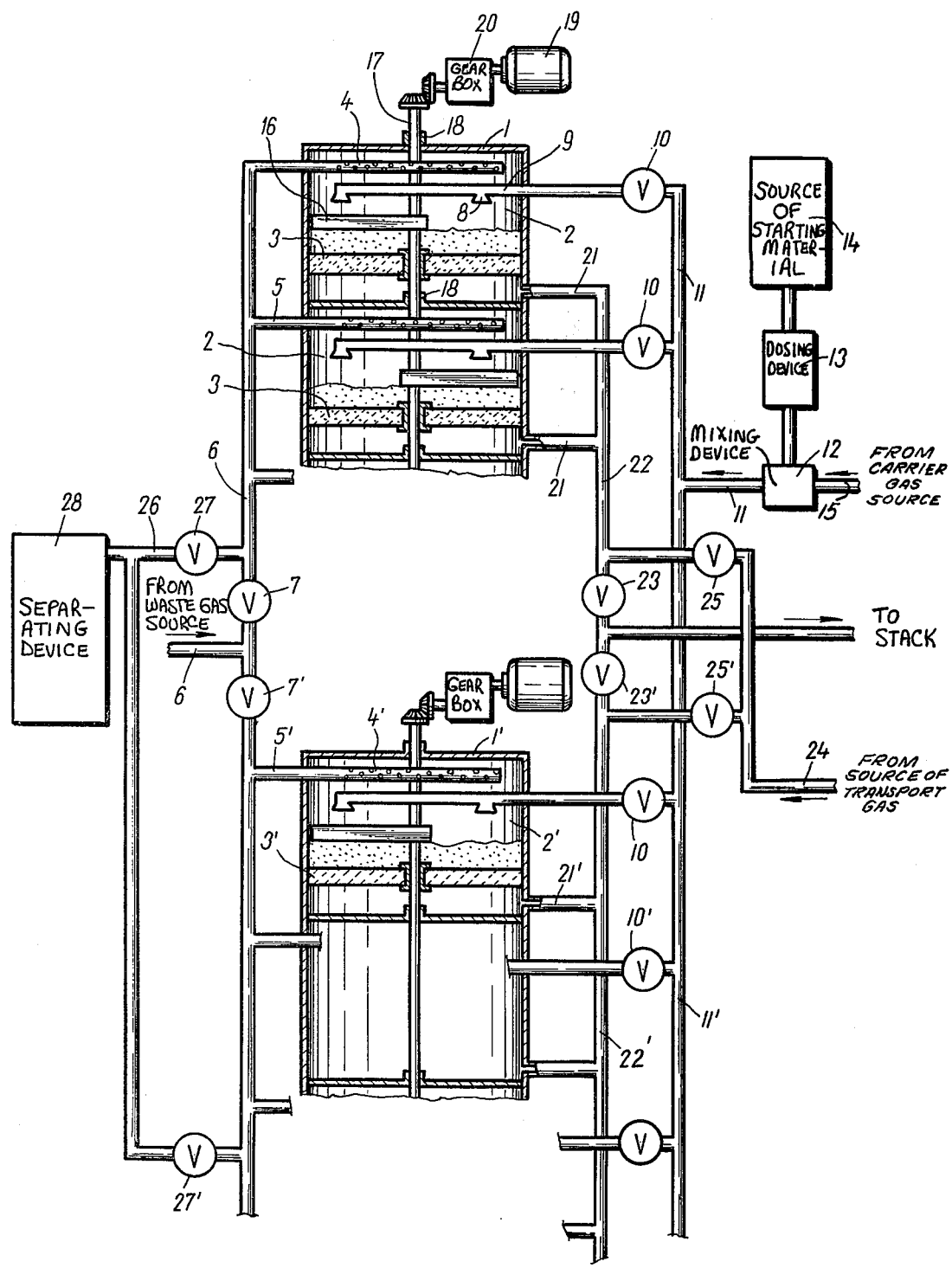

METHOD OF NEUTRALIZING INDUSTRIAL WASTE GASES

BACKGROUND OF THE INVENTION

The invention deals with techniques and arrangements for removing and neutralizing harmful emissions from industrial waste gases, such emissions constituting acidic components such as oxides of nitrogen and sulphur.

As is well-known, air pollution arising from waste gases from industrial plants are of major concern to modern technology, both from the point of view of personal health and also, to some extent, from the point of view of economics. The harmful acidic pollutants in such industrial waste gases may include, e.g. oxides of nitrogen resulting from the manufacture of nitric acid; silicon tetrafluoride, a waste product resulting from the manufacture of superphosphates; and oxides of sulphur, which along with certain nitrogen oxides, originate in the manufacture of sulphuric acid. Additionally, emissions from thermal power stations using low-grade fuel may contain up to 5% by weight of sulphur constituents. Cumulatively, such emissions cause the overall content of acidic pollutants in waste gases to amount to millions of metric tons yearly in some industrialized countries.

Several scrubbing techniques are presently known for removing and neutralizing such acidic components of industrial waste gases. One such method employs, as an active scrubbing agent, aqueous solutions of carbonates of alkaline metals. This technique has the disadvantage of requiring a large consumption of industrial steam.

In the improved technique described, e.g., in U.S. Pat. No. 3,505,008, flue gases are filtered through a thin porous bed made up of crystals of a hydrogen carbonate of an alkali metal at temperatures between 0° and 125° C. Further, as described in U.S. Pat. No. 3,589,863, sulphur dioxide constituents of waste gases are removed by passing the gas to be treated through a stable bed containing particles of hydrogen carbonates of alkaline metals that have a porosity of 10 – 60% and a grain size of 1.6 – 19 mm.

Unfortunately, such techniques require a high investment cost and are not particularly effective when the concentration of the acidic pollutants in the waste gas is lower than, say, 0.2 volume percent; by contrast, in practice, large amounts of gases are produced having a substantially lower concentration of such components. Additionally, it is extremely expensive, difficult and cumbersome in such arrangements to replace the spent active materials in the bed.

SUMMARY OF THE INVENTION

The present invention avoids these disadvantages by providing an improved method of and apparatus for neutralizing acidic components of waste gases by producing, from a suitable starting material, a fluidized or solid bed of an active carbonate and thereafter passing the gases to be treated through the bed.

In the inventive technique, the starting material is selected from one or more of the group of compounds consisting of $MeHCO_3$, $MeHCO_3 \cdot MgCO_3 \cdot yH_2O$, $xMeHCO_3 \cdot Me_2CO_3 \cdot yH_2O$, and $xMeHCO_3 \cdot Me_2CO_3$, where Me is a symbol for an alkaline metal, $x$ is an integer number between 1 and 3, and $y$ is an integer number between 0 and 4.

Such starting material is heated to a temperature between 30 and 200° C in a stream of fresh air and/or a stream of previously treated waste gas from which at least a portion of the acidic pollutants have been removed. The starting material is exposed at such elevated temperature to such gas stream for a period sufficient to form, by thermal decomposition of the starting material, an active carbonate free of hydrates. The humid waste gas to be neutralized is then passed through the bed at a temperature in the range of 100°–200° C.

The gas employed in the stream preferably has a maximum partial pressure of water vapor defined by the equation $$\log p_{H_2O}(\text{Torr}) = 10.825 - \frac{3000}{t°C + 273}.$$

The thermal decomposition of the starting material may be performed either in a fluidized bed or in a fixed bed, with the gas in the stream being maintained at a temperature at least equal to the temperature of decomposition of the starting material. The resultant active carbonate may be exposed, prior to its contact with the humid waste gas, to a medium having an elevated temperature of 112° C maximum for a maximum duration of 30 minutes. In such case, the medium may have a partial pressure of water vapor exceeding the value defined by the equation $$\log p_{H_2O}(\text{Torr}) = 10.825 - \frac{3000}{t°C + 273}.$$

Alternatively, the medium may be maintained at a temperature between 112° and 350° C.

In one feature of the invention, the humid waste gas is flowed in the direction of gravity through the active material, which is disposed in a uniform-thickness bed on a gas permeable horizontal support. After the bed is spent, a transport gas (which may be inert or of the same composition as the cleaned waste gas) is flowed through the bed in the opposite direction to loosen and carry away the particles of the spent active material from the bed. Thereafter, a carrier gas containing fresh active material in an amount corresponding to the required thickness of the bed is flowed in the direction of gravity toward the horizontal support to form a new bed for the next charge of waste gas.

One arrangement for performing the above-mentioned process includes at least one vertically disposed, cylindrical reaction vessel which is divided into at least two isolated chambers disposed one above the other. A horizontal, gas-permeable partition is provided in each chamber to serve as a support for the active carbonate material. A gas distributor having a supply tube is situated in each chamber above the associated horizontal partition. The supply tube is connected to a central gas supply tube that is common to all chambers of the vessel.

Means are disposed above each support to supply the starting material to the bed, each of such means being connected to a common supply tube. Such common tube is connected to a mixing device, into which both the supply of a carrier gas and a conduit from an active material dosing device terminate. An outlet for the removal of the neutralized waste gas is provided below the horizontal partition in the vessel wall, and is connected to a common tube which also selectively receives a supply of the transport gas.

Preferably, such arrangement employs two or more of such reaction vessels, so that while one vessel is being used to treat the waste gas, the other vessels are being re-charged with fresh active material. Consequently, the time and expense of treatment is greatly reduced.

With the aid of the method of treatment in accordance with the invention, it has been found that at the point where 90% of the original starting active carbonate is converted to final products, the reactivity of the active carbonate with respect to the pollutant (e.g., $SO_2$), is at least one order of magnitude higher than the reactivity of the anhydrous carbonates of active metals prepared in accordance with the prior art, e.g., by crystallization from aqueous solutions and subsequent dehydration.

Moreover, with the inventive arrangement, effective neutralization of waste gases can be obtained even where the emissions have a much lower concentration of the acidic pollutants than that which could be satisfactorily handled by the prior art. The inventive arrangement can also operate at gas velocities which are above the maximum velocity of fluidization of particles of the active material. Moreover, since the waste gas which is to be purified is flowed in the direction of gravity toward a horizontal partition that is pervious to gases, no separating device need be installed in the reaction vessel.

BRIEF DESCRIPTION OF THE DRAWING

The invention is further set forth in the following detailed description taken in conjunction with the appended drawing, in which the single figure indicates schematically an arrangement in accordance with the invention for neutralizing acidic pollutants in industrial waste gases.

DETAILED DESCRIPTION

As in the prior art, a fluidized or solid bed of an active carbonate is first suitably prepared from a starting material, and then humid waste gases containing acidic pollutants such as oxides of nitrogen or sulphur is passed through the bed to be neutralized.

In accordance with the invention, the starting substance for the active carbonate is selected from the group consisting of at least one of the following compounds: $MeHCO_3$, $MeHCO_3 \cdot MgCO_3 \cdot yH_2O$, $xMeHCO_3 \cdot Me_2CO_3 \cdot yH_2O$, and $xMeHCO_3 \cdot Me_2CO_3$, where Me is a symbol for an alkaline metal, $x$ is an integer number between 1 and 3, and $y$ is an integer number between 0 and 4. Such starting substance is then heated to a temperature in the range of 30° – 200° C by contact with a stream of gas from which at least a portion of acidic pollutants have been removed until a substantially hydratefree active carbonate of the alkaline metal employed as the starting substance is formed by thermal decomposition. The humid waste gases are then passed through the so-activated carbonate at a temperature in the range of 100° – 200° C.

The activating gas in the stream may be fresh air, or may be recirculated waste gases from which a portion of the pollutant has been removed. In any case, the maximum partial pressure of water vapor of the activating gas is defined by the equation $$\log p_{H_2O}(\text{Torr}) = 10.825 - \frac{3000}{t° C + 273}.$$

The temperature of the activating gas is preferably at least equal to the decomposition temperature of the starting substance.

Following the activation of the starting substance and prior to the flowing therethrough of the waste gas, the active carbonate may be exposed to a medium of 112° C maximum for a maximum time interval of 30 minutes. In such case, the partial pressure of water vapor of the medium may exceed the value defined by the equation $$\log p_{H_2O}(\text{Torr}) = 10.825 - \frac{3000}{t° C + 273}.$$

Alternatively, such medium may exhibit an elevated temperature in the range of 112° – 350° C.

In a preferred technique of employing the so-prepared active material in a waste gas neutralization step, such active carbonate bed may be supported on a gas-permeable element. The waste gas to be neutralized is flowed in the direction of gravity through the bed until the active carbonate therein becomes spent. Thereafter, a separate transport gas, which may have the same composition as the neutralized waste gas, is flowed through the spent bed in a direction opposite to the direction of gravity through the bed to release the spent particles therefrom. Thereafter, the bed is replenished by flowing fresh starting material toward the permeable support in the direction of gravity. Such last-mentioned technique for utilizing the active carbonate prepared in accordance with the invention is illustrated in the drawing. The arrangement shown includes a pair of reactors 1, 1', each in the shape of a vertically disposed cylinder having a rotatable shaft 17 extending along its axis. Each shaft is connected via a transmission gear 20 with a driving motor 19. Each vessel is divided into at least two isolated, superposed chambers.

A plurality of horizontal, hermetically sealed support partitions 3, 3' are individually arranged in the chambers 2, 2'. Each partition 3 may consist, e.g., of a plate of sintered glass or porous ceramic fixed between two horizontal metal grids (not shown). A pair of gas distributors 4, 4' having supply tubes 5, 5' connected to a central gas supply tube 6 are fixed in the spaces above the respective horizontal partitions 3, 3'. The central gas supply is common to all the chambers 2, 2' of the reactor vessels.

Central closing valves 7, 7' are installed in the central gas supply tube 6 and are adapted for closing individually and independently the gas supply into each reactor 1, 1'. An arm 9 rotatable in the horizontal plane and serving for supply of the active carbonate material prepared as indicated above has four distributing ports 8 and is fixed in the upper part of each chamber 2, 2'.

All of the arms 9 are coupled via individual valves to a common tube 11 for the pneumatic supply of the active material. The common tube 11 is connected to a mixing device 12, into which are conducted a supply tube 15 for a suitable carrier gas and a tube from a dosing device 13.

The device 13 is fed from a storage bin 14 containing the above-mentioned starting material. A horizontal rake 16, the lower edge of which is supported approximately 100 mm above the associated partition 3, is affixed to the rotatable shaft 17. Outlets 21, 21', connected respectively to common tubes 22, 22' are provided in the walls of the reactor vessels for removal of the treated waste gas from the associated chambers 2, 2'. Central valves 23, 23', individual to each reactor 1, 1', are provided in the common tubes 22, 22'. A supply tube 24 for a transport gas, fitted with central valves 25, 25' individual to each reactor, is also connected to the tubes 22, 22'.

A connecting tube 26 having valves 27, 27' associated with each reactor 1,1' connects a common separating device 28 to the central gas supply tube 6.

In the operation of the arrangement shown in the drawing, the waste gas from which an acidic pollutant such as $SO_2$ is to be removed, is flowed into the vessels 1, 1' via the central gas supply tube 6, the tube 5, and the gas distributor 4 into the individual chambers 2, 2'. From the distributor 4, the waste gas flows downwardly to an activated bed prepared as described above and situated on the gas permeable support 3, and such treated gas is removed from the region in the chamber below the bed into the atmosphere via outlets 21, 21', common tubes 22, 22', open control valves 23, 23' and a stack (not shown).

During such neutralization of the waste gas, the valves 27, 27' coupled to the separating device 28, as well as the valves 10, 10' for the supply of solid active carbonate from the mixing device 12 and the valves 25, 25' for the transport gas are closed.

After the active carbonate bed is spent, the waste gas valves 7, 7' and the central valves 23, 23' are closed, and the vessels 1, 1' are reactivated for a new gas neutralization cycle.

This is accomplished by first removing all the spent active material from the chambers 2, 2', as by passing compressed transport gas through the supply tube 24 via the now-opened central valves 25, 25'. The particles of spent active material are driven against the direction of gravity by the transport gas and are coupled, by means of the gas distributor 4 and the supply tube 5, to the central gas supply tube 6 where they then pass over the now-opened valves 27, 27' into the separating device 28. Thereafter, the valves 27, 27' in front of the separating device 28 and the valves 25, 25' for the transport gas are closed.

The replenishing of the chambers 2, 2' of the reactors 1, 1' with fresh starting material is accomplished in an air stream at an overpressure of 2 kp/cm² at a working load of 10 kg/m³. The carrier gas (i.e., the air stream), enters the mixing device 12 via tube 15, and is mixed therein with a dose of starting material from bin 14, such dose being controlled by the dosing device 13.

The carrier gas containing particles of solid material leaves the mixing device 12 and enters the individual chambers 2, 2' via tubing 11. In the chamber, the solid phase settles on the horizontal partitions 3, 3', while the carrier gas separated therefrom and leaves the chambers 2, 2' by way of the common tubes 22, 22' over the central valves 23, 23'.

The deposited starting material is uniformly distributed on the supports 3, 3' by the rakes 16 fixed on the rotating shaft 17. The activating of the starting material deposited on the partitions 3, 3' is achieved by a separate blower (not shown) which is illustratively designed to recirculate more than half the amount of waste gas previously treated. To accomplish this, the valves 10, 10' for the supply of solid material and the valves 25, 25' for the transport gas are first closed; the activating gas stream enters the chambers of reactors 1, 1' at a temperature of 150° C via supply tube 5 and gas distributor 4 to activate the starting material. Such gas stream is discharged, after passage through the layer of carbonate and the horizontal partition, via the outlets 21, 21', the common tubes 22, 22' and the now-opened valves 23, 23' into the stack.

After the reactivation is complete, the central valves 7, 7' and 23, 23' are opened and the valves 27, 27', 10, 10' and 25, 25' are closed to prepare the reactivated vessels 1, 1' for the next waste gas neutralization cycle.

Without in any way limiting the generality of the foregoing, the following examples 1 – 2 are illustrative of the inventive method, while example 3 is illustrative of such method when carried out with the aid of the above-described apparatus.

EXAMPLE I

Starting material consisting of sodium hydrogen carbonate ($NaHCO_3$) having a grain size of 0.33 – 0.50 mm was brought to a fluidized state by an air stream having a space velocity of 4000 hours$^{-1}$. The thermal decomposition of such starting material was accomplished by heating the fluidized layer by preheated air from room temperature to 130° C in a time span of 10 minutes. The heated material was maintained at such 130° C temperature for the following 30 minutes to complete the activation. Waste gas containing hydrogen, oxygen, carbon dioxide, steam and nitrogen dioxide (the latter pollutant being present in a concentration of 0.1 vol.%) was subsequently brought into contact with the active material at a temperature of 150° C. After only 30 minutes of application, the active solid material in the bed was found to include 20.7% by weight of combined sodium nitrate and sodium nitrite, the ratio of nitrate to nitrite being 11.6.

EXAMPLE 2

Starting material consisting of $NaHCO_3$ having a maximum grain size of 0.1 mm was deposited as a fixed bed on a porous support. In order to activate the material, a stream of gas containing nitrogen, oxygen, carbon dioxide, steam and sulphur dioxide (the latter in a concentration of 0.002 vol.%) is flowed through the activated fixed bed in the direction of gravity at a space velocity of 400 hours$^{-1}$. The gas stream is raised to a temperature corresponding to the dissociation temperature of the starting material by a pre-heated gas, which has been warmed to 120° C within 5 minutes and then raised to 200° C after 10 minutes at the 120° C level. The activated bed was found to contain 97.2% by weight of active carbonate, 0.5% by weight of sodium sulphite and sodium sulphate and 2.3% by weight of non-active sodium carbonate.

The active soda prepared in accordance with the previous paragraph was contacted, at a temperature of 120° C, with waste gas containing 15 vol.% of carbon dioxide, 6 vol.% of oxygen, 2.5 vol.% of steam and 0.13 vol.% of sulphur dioxide at a space velocity of 70,000 hours$^{-1}$.

During the time that the amount of sulphur dioxide passing through the activated bed corresponded to ½ of the stoichometric amount of soda, more than 99% of such sulphur dioxide was removed. The efficiency of such gas entrapment did not drop below 90% until the quantity of sulphur dioxide passing through the bed corresponded to 80% of the stoichometric amount of soda.

EXAMPLE 3

The apparatus employed in this Example used two pairs of the vessels 1, 1' having ten chambers each. While in one pair of the reactors the acidic pollutant of the waste gas was removed by chemical reaction with the active material (i.e., the sorption cycle), in the second pair of reactors the emptying of spent active material and the recharging thereof with fresh starting material (followed by the activation of such starting material) was taking place. Both reactor pairs operated with eight-hour working cycles.

During the gas neutralization cycle, the waste gas from which the acidic pollutants were to be removed exhibited a temperature of 150° C and contained, in addition to nitrogen, 15 vol.% of carbon dioxide, 6 vol.% of oxygen, 2.5 vol.% of water vapor and 0.13 vol.% of sulphur dioxide. Such waste gas was passed through activated carbonate which had been deposited during the previous replenishment cycle in a uniform layer having a height of 12 cm on the partitions 3.

With such arrangement it was found that when sufficient sulphur dioxide in the waste gas had passed through the reactor vessels corresponding to ⅔ of the stoichiometric amount of the activated carbonate, the neutralized gas had been deprived of more than 95% of such sulphur dioxide.

In the foregoing, illustrative techniques and apparatus of the invention have been described in detail. Many variations and modifications of such methods and apparatur will now occur to those skilled in the art. It is accordingly desired that the scope of the appended claims not be limited to the specific disclosure herein contained.

What is claimed is:

1. In a method of remaining acidic pollutants comprising oxides of nitrogen and sulfur and silicon tetrafluoride from humid industrial waste gases by producing from a starting material a bed of an active carbonate and thereafter passing the humid waste gases to be treated through the bed, the improvement wherein the producing step employs as a starting material at least one member selected from the group consisting of $MeHCO_3$, $MeHCO_3 \cdot MgCO_3 \cdot y\,H_2O$, $xMeHCO_3 \cdot Me_2CO_3 \cdot y\,H_2O$, and $xMeHCO_3 \cdot Me_2CO_3$, where Me represents an alkaline metal, $x$ is an integer from 1 to 3 and $y$ is an integer from 0 – 4, wherein the producing step comprises heating said starting material to a temperature in the range of 30° – 200° C by contact with a stream of gas having a maximum partial pressure of water vapor defined by the equation.

$$\log P_{H_2O}(\text{Torr}) = 10.825 - \frac{3000}{t°\,C + 273}$$

until a substantially hydrate-free active carbonate of the alkaline metal is formed by thermal decomposition of the starting material, and wherein the step of passing the humid waste gases through the bed is accomplished at a temperature in the range of 100° – 200° C.

2. A method as defined in claim 1, in which the gas in the stream is selected from the group consisting of at least one of the following: fresh air, and waste gases having a relatively low concentration of said acidic pollutant.

3. A method as defined in claim 1, in which the thermal decomposition of the starting substance is accomplished in a fluidized bed.

4. A method as defined in claim 1, in which the thermal decomposition of the starting substance is accomplished in a fixed bed.

5. A method as defined in claim 1, in which the temperature of the gas in the gas stream is at least equal to the decomposition temperature of the starting substance.

6. A method as defined in claim 1, in which the active carbonate is exposed to a medium having an elevated temperature of 112° C maximum for a maximum time interval of 30 minutes prior to the step of passing the humid waste gases through the bed.

7. A method as defined in claim 6, in which the medium has a minimum partial pressure of water vapor exceeding the value defined by the equation $$\log p_{H_2O}(\text{Torr}) = 10.825 - \frac{3000}{t°\,C + 273}.$$

8. A method as defined in claim 1, in which the active carbonate is exposed to a medium having an elevated temperature in the range of 112° – 350° C prior to the step of passing the humid waste gases through the bed.

9. A method as defined in claim 1, in which the active carbonate bed is supported on a gas-permeable element, in which the step of passing the humid waste gases through the bed comprises flowing the waste gas in the direction of gravity through the bed, and wherein the method further comprises the step of passing a transport gas through the spent bed in a direction opposite to the direction of gravity to release the spent particles from the bed, and thereafter replenishing the bed by flowing fresh active carbonate toward the permeable element in the direction of gravity.

10. A method as defined in claim 9, in which the transport gas has the same composition as the waste gas.

* * * * *